Per Johan Berggren de Nygorden.
Luke Albert Perrenod.
*INVENTORS.*

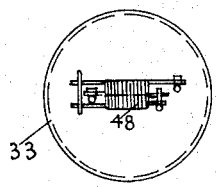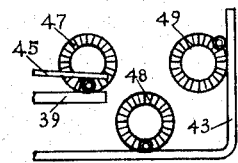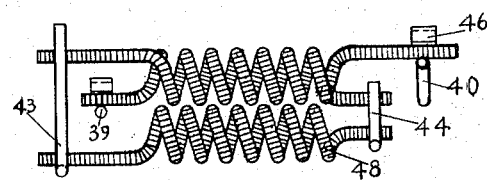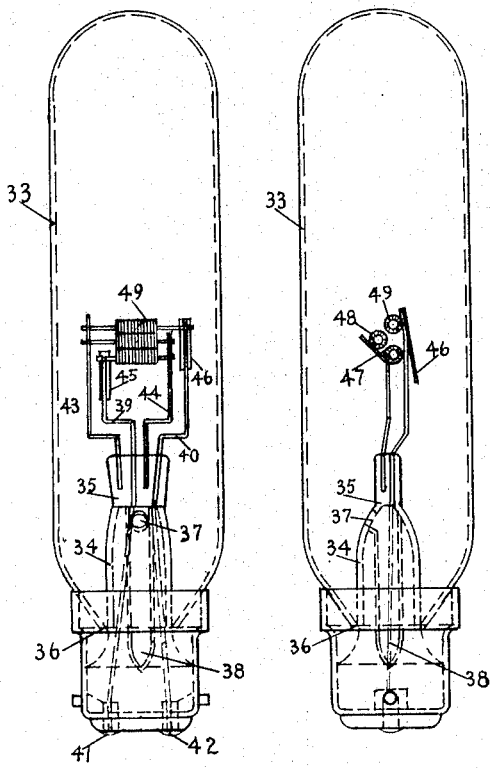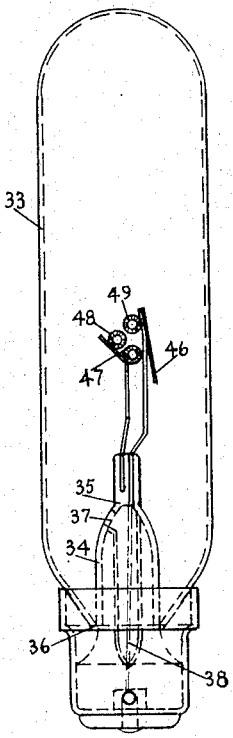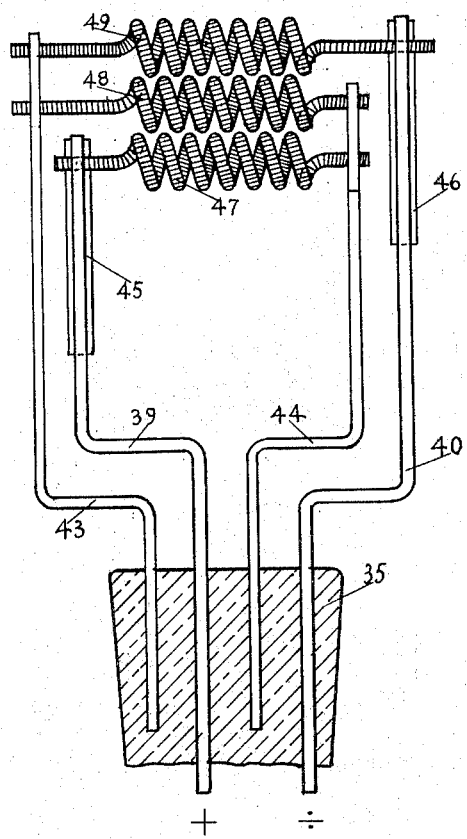
Per Johan Berggren de Nygorden.
Luke Albert Perrenod.
*INVENTORS*

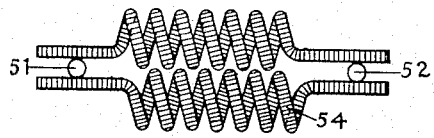
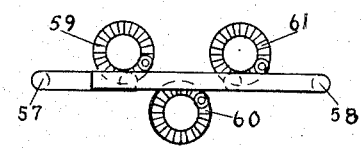
Fig. 16.  Fig. 18.
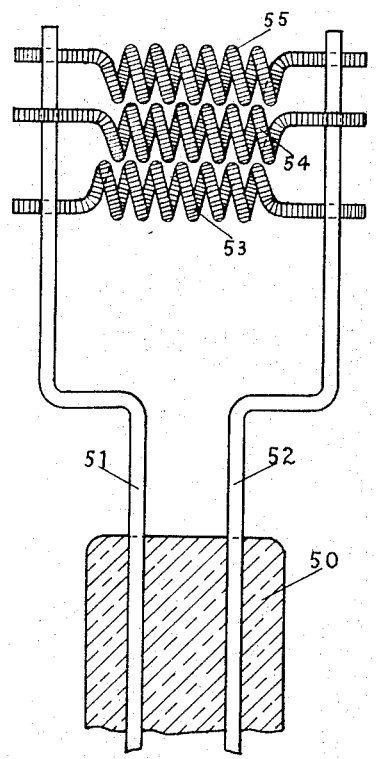
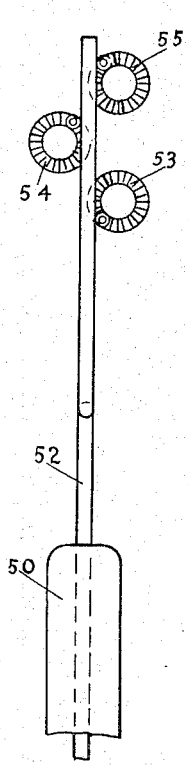
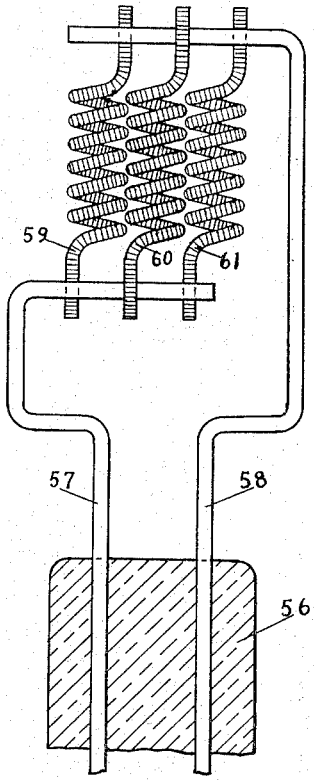
Fig. 14.   Fig. 15.   Fig. 17.
Per Johan Berggren de Nygorden.
Luke Albert Perrenod.
*INVENTORS*

United States Patent Office 3,364,377
Patented Jan. 16, 1968

3,364,377
INCANDESCENT ELECTRIC LAMP
Per Johan Berggren de Nygorden, Bronx, and Luke Albert Perrenod, Bayside, N.Y., assignors to Institute of Natural Sciences, Inc., a corporation of the District of Columbia
Filed Oct. 14, 1964, Ser. No. 403,762
3 Claims. (Cl. 313—272)

ABSTRACT OF THE DISCLOSURE

In a light source for a projection system, an incandescent electric lamp is provided having a triad assembly of the filament coils. The arrangement is such that the projections of the helical axis of all three coils on any plane perpendicular to their axis form an isosceles triangle with the effective width of each coil being equal substantially to one-third of the total width of the filament area. The centermost coil in the triad assembly extends in a plane normal to and intersecting a predetermined optical axis. The total effect of the assembly is such that a minimum area of an incandescent filament unit is provided where there are no empty or dark spots in the filament area with the center of the assembly aligned with the optical axis.

This invention relates to incandescent electric lamps and relates more particularly to lamps employed for projection purposes. Still more does this invention relates to a particular filament design and the construction of the support for the individual elements that compose the filament unit.

The light source is the heart in any optical projection system. The better the light flux can be gathered and directed into preferred channels, the better will be the illumination and the definition of the projected image. By properly designed optical condensing lens unit, the marginal rays can be so focused as to cover the entire surface of the projected picture and continue to taper down to an area small enough to fully enter the rear element of the projection objective lens unit. That is an ideal condition and is applicable only to the marginal rays; but if the light source is of a small enough area also to the principal rays. If the axial-tangential circle of illumination, which is the projected image of the light source, becomes larger than to cover the projected picture, the light outside of the picture area is superfluous and of no utility.

It is known in this art, that a high intensity light point as a source of illumination is the ideal condition in an optical projection system because the axial-tangential rays, which are the principal rays, nearly coincide with the marginal rays and thus the circle of illumination can be limited to a most efficient diameter.

There is nothing new or novel to make a few coils or coiled coils of tungsten wire, weld them well spread to some kind of supporting mount, either in series or parallel or a combination of both as taught by G. Chelioti in U.S. Patent No. 1,985,915; or eight or ten coils of tungsten wire with half of the number of coils each staggered and alternated into a biplane aggregate as taught by Howard E. Allen in U.S. Patent No. 1,953,456 and William P. Gero in U.S. Patent No. 2,605,440; all constituting large areas of light source, which is a waste of light and energy and a producer of undesired additional heat, both in the lamphouse and at the picture aperture.

The object of this invention is the construction of a new and novel incandescent electric lamp that can be advantageously used as a source of illumination in optical projection systems and, as much as possible, adhere to the previously cited principles and thereby give a maximum of controllable light at the points or places where it can be most efficiently utilized.

To apply these principles into a workable reality certain basic conditions had to be considered. First, a minimum area of the incandescent filament unit. Second, a continuous and even light over the whole filament area with no empty or dark spots anywhere. Third, to provide a simple and reliable structure on which the coiled elements can be readily and conveniently mounted in desired spaced positions so as to comply with the first and second conditions.

Having established these basic conditions as guideposts for a possible design, the following details were decided upon:

(1) The maximum filament area of a lamp of 75 to 150 watts to be 1/4" x 1/4".
The maximum filament area of a lamp of 200 to 300 watts to be 5/16" x 5/16".
The maximum filament area of a lamp of 400 to 500 watts to be 3/8" x 3/8", etc.
(2) The filament area should be fully covered by the individual coils or coiled coils, which compose the filament unit.

We have found that the most efficient way to accomplish this was to make the filament unit a triad, where the individual coil or coiled coil has a length equal to the height and a width equal to one-third of the width of the filament unit. Of course, if the individual coils were mounted side by side in the same plane they would touch each other and cause a short circuit. To prevent that the coils are staggered with two of them mounted in one plane spaced equidistant to their diameter and the third coil is mounted either in front or behind in another plane, so as to cover the empty space between the two other coils and at sufficient distance to prevent a short circuit or a voltage jump-over within the lamp when in service.

It is also very important that the structure for the support and proper placing of the individual coils that compose the filament unit, be so arranged that while both supporting and connecting the individual coils in a certain order, none of the parts should be so close as to invite voltage jump-over, nor any of the wire ends pointing in directions toward each other or any filament parts of a different potential. By placing the individual coils of the filament unit parallel and in as close proximity to each other as good engineering prescribes, there will be a heat interaction between the filament coils, raising the temperature and producing a greater amount of light flux for the same amount of electrical energy.

To function correctly, the filament front plane should be normal to the optical axis of the system. If the lamp is to be used on regular service line voltage of 110 to 120 volts, the filament coils are connected in series. If a controlled lower voltage is used, the filament coils can be connected parallel. In either case, the filament coils can be mounted vertical, horizontal or at any other desired angle to the base by properly designed structural supporting members.

Other objects and merits of the present invention, either recited or implied, will be apparent to those skilled in the art, as it is set forth in the following description together with the accompanying drawings in which like numerals of reference indicate identical parts throughout, where:

FIGURES 1 through 7 of the drawings indicate the application of certain novel combinations of principles and structures in this invention of an incandescent electric lamp with vertical filament coils, preferably for base down position and of lower power, 75 to 150 watts at 110 to 120 volts.

FIG. 8 is an elevational front view of a projection lamp embodying certain other features of this invention.

FIG. 9 is an elevational side view of the same projection lamp.

FIG. 10 is an enlarged view of the principal parts of FIG. 8, showing the filament and mount in accordance with the present invention.

FIG. 11 is an enlarged top view of the enlarged FIG. 10.

FIG. 12 is an elevational side view of FIG. 11.

FIG. 13 is a top plan view of FIG. 8.

FIGURES 8 through 13 of the drawings illustrate the application of certain other novel combinations of principles and structures in this invention with horizontal filament coils, where the lamp can be used both in a vertical or horizontal or any other angular position and with a larger base, and if needed, larger and different shaped bulbs, for higher power, 200 watts and up.

FIG. 14 is an elevational front view of a filament unit with the three coiled coils connected horizontally and in parallel.

FIG. 15 is an elevational side view of the same filament unit and illustrates the placing and the connection of the individual coiled coils.

FIG. 16 is a top plan view of FIG. 14 of the filament unit.

FIG. 17 is an elevational front view of a filament unit with the three coiled coils connected vertically and in parallel.

FIG. 18 is a top plan of view of FIG. 17 of the filament unit and illustrates the placing and the connection of the individual coiled coils.

FIGURES 14 through 18 of the drawings illustrate the application of either horizontal or vertical parallel connections of the individual coiled coils in the filament unit and with their simplified support structure.

Figure 1:
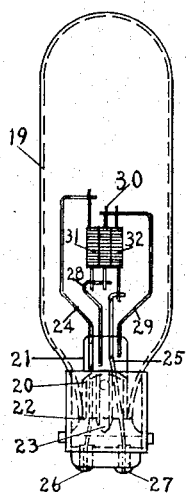
FIG. 1 is an elevational front view of a projection lamp embodying certain features of this invention.
Figure 2:
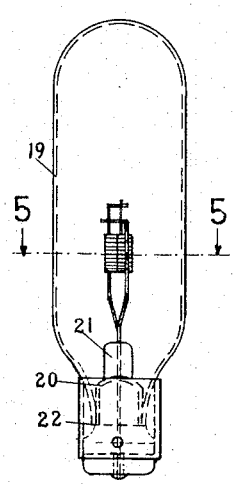
FIG. 2 is an elevational side view of the same projection lamp.

A lamp constructed in accordance with the present invention is shown in FIGURES 1 and 2 may compose a bulb 19 provided with a flare tube 20 having a press 21. The flare tube may be sealed in the usual manner at 22 to the bulb 19 which latter may contain atmosphere such as nitrogen or argon, and the usual exhaust tube 23 for sealing the bulb from the outside atmosphere. Within the bulb, and extending from press 21, are conductive support members 24 and 25 having their lower ends imbedded in the press 21 and connected to the base contacts 26 and 27 respectively. The supporting members 28 and 29, which are also connecting wires between the individual filaments coils, having their ends imbedded in the press 21, but are insulated from the conducting lead-in wires.

Figure 4:
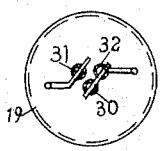
FIG. 4 is a top plan view of FIG. 1.
Figure 5:
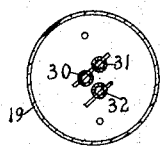
FIG. 5 is a transverse sectional view of the lamp in FIG. 2, in the direction of the arrows, along line 5—5.
Figure 6:
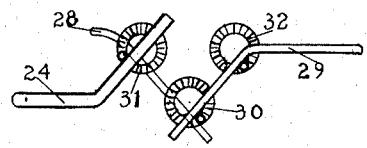
FIG. 6 is an enlarged top view of the enlarged FIG. 3.
Figure 3:
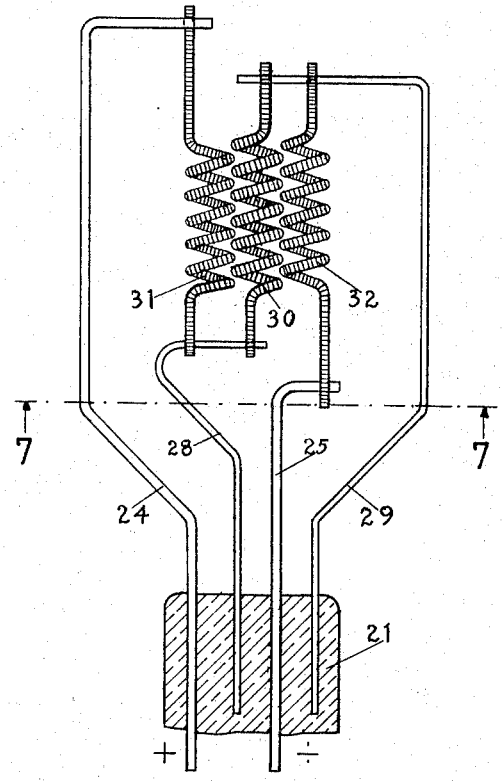
FIG. 3 is an enlarged view of the principal parts of FIG. 1, showing the filament and the structural mount in accordance with the present invention.
Figure 7:
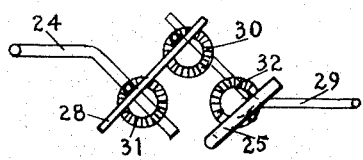
FIG. 7 is a transverse sectional view of FIG. 3, in the direction of the arrows, along line 7—7.

The filament unit consists of three vertical coiled coils 30, 31 and 32. FIGURES 1, 2, 4, and 5 are full scale and illustrate the size and positions of the parts comprising the whole lamp. FIGURES 3, 6 and 7 are enlarged details of the filament unit, to better illustrate the relative position of the different parts, and the support and electrical connections of the coiled coils, which compose the filament proper. The lead-in wires 24 and 25 are doing double duty, so are the support wires 28 and 29. The lead-in wire 24 carries the electric current from the base contact 26 to the filament coil 31. It is also the top support of this coil and reaches above the other coils and their supports, which have different electrical potentials. The lower end of coil 31 is welded to and held in place by support wire 28. The lower end of coil 30 is also welded to and held in place by support wire 28, which makes the electrical connection between coil 31 and coil 30. The upper ends of coils 30 and 32 are welded to and kept in proper place by support wire 29, which makes the electrical connection between coil 30 and coil 32. The lower end of coil 32 is welded to and held in place by lead-in wire 25, which is connected to the base contact 27 and thus completes the electrical circuit in the lamp.

It may be said that this construction is a novel and efficient simplicity, by making the filament unit a triad, filling completely a minimum light source area, normal to the optical axis and by staggering the relative position of the individual coils and anchoring them to their designated places by the combination of lead-in and supporting members. In this design, the filament coils are series connected and in a vertical position to the base, and preferably for lamps 75 to 100 watts on a line voltage of 110 to 120 volts.

Another lamp, constructed in accordance with the present invention, is shown in FIGURES 8 and 9 and may comprise a larger bulb 33 provided with a flare tube 34 having a press 35. The flare tube may be sealed in the usual manner at 36 to the bulb 33, which latter may contain atmosphere such as nitrogen or argon, and the usual vent 37 and exhaust tube 38 for sealing the bulb from the outside atmosphere. Within the bulb and extending from the press 35 are conduction support members 39 and 40 having their lower ends imbedded in press 35 and connected to the base contacts 41 and 42 respectively. The supporting members 43 and 44 are also connecting wires between the individual filament coils have their ends imbedded in press 35, but are insulated from the conducting lead-in wires. The lead-in members 39 and 40 have heatsink strips 45 and 46 welded to the union weld with the filament coils for radiation of excess heat at the contact points between the lead-in wires and the coils.

The filament unit consists of three horizontal coiled coils 47, 48 and 49. FIGURES 8, 9 and 13 are full scale and illustrate the size and positions of the parts comprising the whole lamp. FIGURES 10, 11 and 12 are enlarged details of the filament unit to better illustrate the relative position of the different parts, the special support and the electrical connections of the coiled coils, which compose the triad filament proper. The lead-in wires 39 and 40 are doing double duty, so are the support wires 43 and 44. The lead-in wire 39 carries the electric current from the base contact 41 to the filament coil 47. It also is the support of this coil and of the heatsink 45. The other end of coil 47 is welded to and held in place by support wire 44. The parallel end of coil 48 also is welded to and held in place by support wire 44, which makes the electrical connection between coil 47 and coil 48. The other end of the coil 48 and the first end of coil 49 are welded to and kept in proper place by support wire 43, which makes the electrical connection between coil 48 and coil 49. The other end of coil 49 is welded to and held in place by lead-in wire 40, which is connected to the base contact 42 and also supports the heatsink 46.

This is the horizontal filament coil design with the same efficient simplicity as in the vertical filament coil design. It is the triad principle with the staggered position of the three individual filament coils, filling the whole light source area, keeping it at a minimum, and the structure for locating and supporting the same in proper place. In this design the filament coils are series connected and in a horziontal position to the base, which is of a larger dimension and preferable to lamps of higher power of 200 watts and up on a line voltage of 110 to 120 volts.

FIGURES 1 through 13 illustrate views in different plans, both in section and in elevation, of lamps with the filament coils connected in series for service on usual line voltage of 110 to 120 volts. The basic idea in this invention is the triad assembly of the filament coils. In fact, it is the invention. It is logical to reason that the triad design is not exclusively a series-connection of the filament coils. It also can be a parallel connection. However, lower voltage will be preferable, or even necessary if filament coils of stable condition are required.

FIGURES 14, 15 and 16 are views illustrating the parallel connections of the three coiled coils, comprising the triad filament unit, in a horizontal position to the lamp base, with the press 50, where the combined lead-in and support wires 51 and 52 are imbedded. The three filament coils 53, 54 and 55 are welded at opposite ends to the combined lead-in and support wires 51 and 52 which are parts of the electric circuit. FIGURE 15 illustrates the staggered position of the coils and their weld to the lead-in wire.

FIGURES 17 and 18 are views particularly illustrating the parallel connections of the three coiled coils comprising the triad filament unit, in a vertical position to the lamp base, with the press 56, where the combined lead-in and support wires 57 and 58 are imbedded. The three filament coils 59, 60 and 61 are welded at opposite ends to the combined lead-in and support wires 57 and 58, which are parts of the electric circuit. FIGURE 18 illustrates the staggered position of the coils and their weld to the lead-in wires.

By reason of the present constructions, the sections of coiled coils may be conveniently mounted in their desired triad relation, which compose the filament unit. Furthermore, by using short and compact individual coiled coils, welded at both ends to structural support members, their position is secured and the desired function of the triad filament unit is assured in any selected angular position. It will be noted, that with the present triad arrangement of the filament coils in close parallel alignment to each other, the radiated heat from each individual coil strikes the other coils, thus raising their temperature above what the electrical energy alone would have done and producing a more brilliant light. It also may be presumed that getting more light for less electrical energy, the active life of the filament unit will be notably prolonged. (That is not an assumption, it is a proven fact. A 300 watt, 110 volt projection lamp with the triad filament unit, has at the present time, given over 1000 hours of service in an electrostatic projection flow printer, when before, standard 300 watt, 110 volt projection lamps averaged 25 to 28 hours of service.)

Although preferred embodiments of the invention are shown and described herein, it is to be understood that modifications may be made therein without departing from the spirit and scope of the invention as set forth in the appended claims.

What is claimed is:

1. A projection light source for illuminating a predetermined object area of predetermined profile, comprising an incandescent filament bulb filament means in said bulb for emitting light along a predetermined optical axis, said filament means occupying a filament area defined in planes normal to the optical axis, said filament means consisting of a triad filament assembly including three coiled filaments only, each of said filaments constituted by a helical winding having an effective length substantially equal to one dimension of said profile and an effective width equal substantially to one third of the other dimension of said profile; means mounting said coils, said coils being mounted by said mounting means with their respective helical axes parallel to one another; the helical axis of one of said coils being spaced from the common plane defined by the helical axes of the other two coils and lying in a plane intermediate thereof, such that the projections of the helical axes of all three coils, on any plane perpendicular to all of said axes form an isosceles triangle the axis of said one of said coils extending in a plane substantially normal to and substantially intersecting said optical axis.

2. A projection light source in accordance with claim 1, wherein said predetermined filament area is rectangular optical axis is substantially co-extensive with said predetermined profile.

3. A projection light source in accordance with claim 1, wherein said predetermined filament area is rectangular and measures from 4/16 inch by 4/16 inch through 9/16 inch by 9/16 inch for lamps of from 75 to 150 watts through 400 to 500 watts.

References Cited

UNITED STATES PATENTS

| 1,591,910 | 7/1926 | Burnap | 313—276 |
|---|---|---|---|
| 1,653,385 | 12/1927 | Beggs | 313—276 |
| 2,673,489 | 3/1954 | Critoph, et al. | 313—316 |

FOREIGN PATENTS 575,175  2/1946  Great Britain.

JOHN W. HUCKERT, *Primary Examiner.*

A. JAMES, *Assistant Examiner.*

UNITED STATES PATENT OFFICE
CERTIFICATE OF CORRECTION

Patent No. 3,364,377 January 16, 1968

Per Johan Berggren de Nygorden et al.

It is certified that error appears in the above identified patent and that said Letters Patent are hereby corrected as shown below:

Column 6, line 29, after "wherein" cancel "said predetermined filament area is rectangular" and insert -- the width of said coils in plan view along the --.

Signed and sealed this 30th day of December 1969.

(SEAL)
Attest:

Edward M. Fletcher, Jr.
Attesting Officer

WILLIAM E. SCHUYLER, JR.
Commissioner of Patents